June 1, 1926.
C. G. OLSON
HOBBING MACHINE
Filed Dec. 6, 1922
1,587,029
2 Sheets-Sheet 2
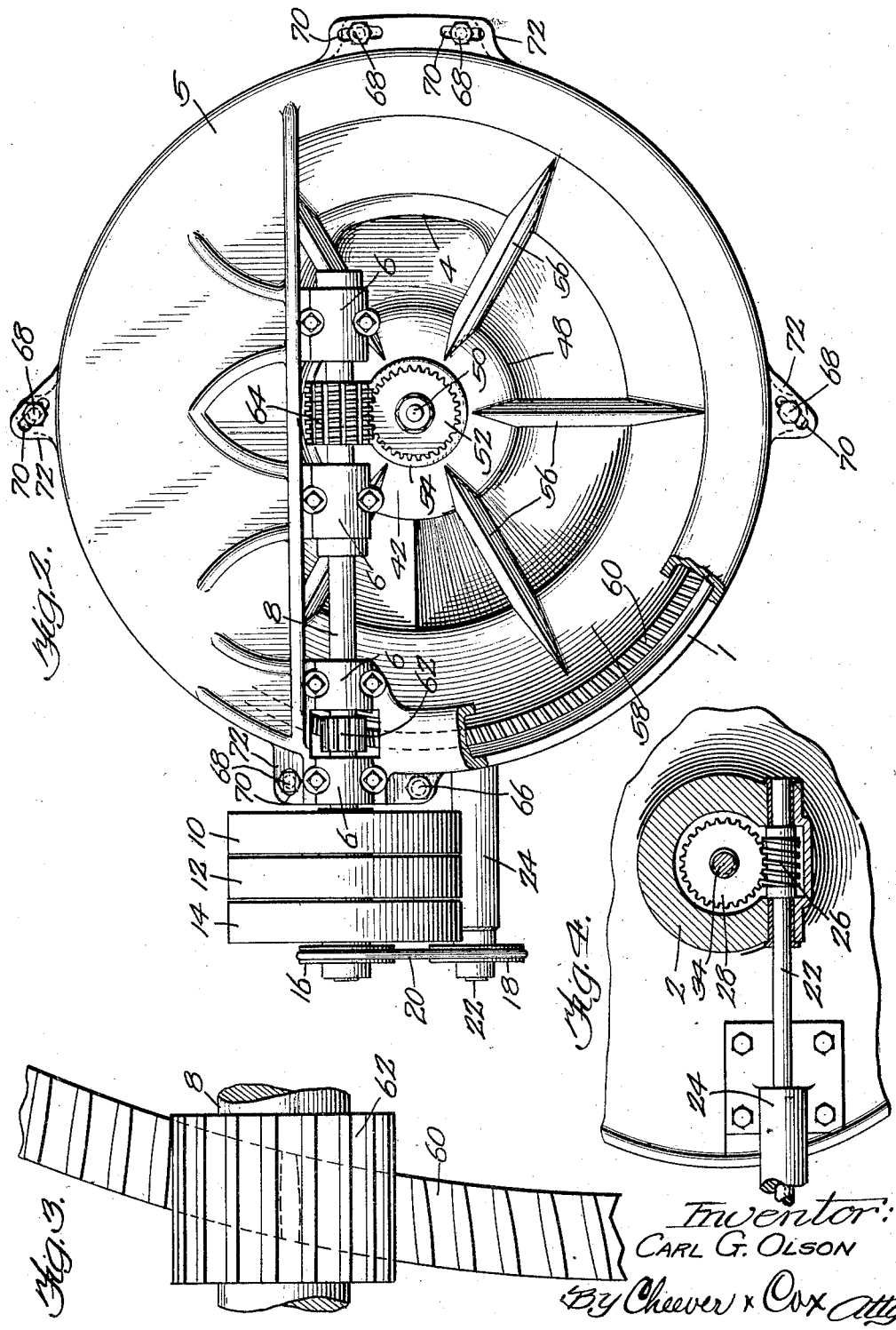

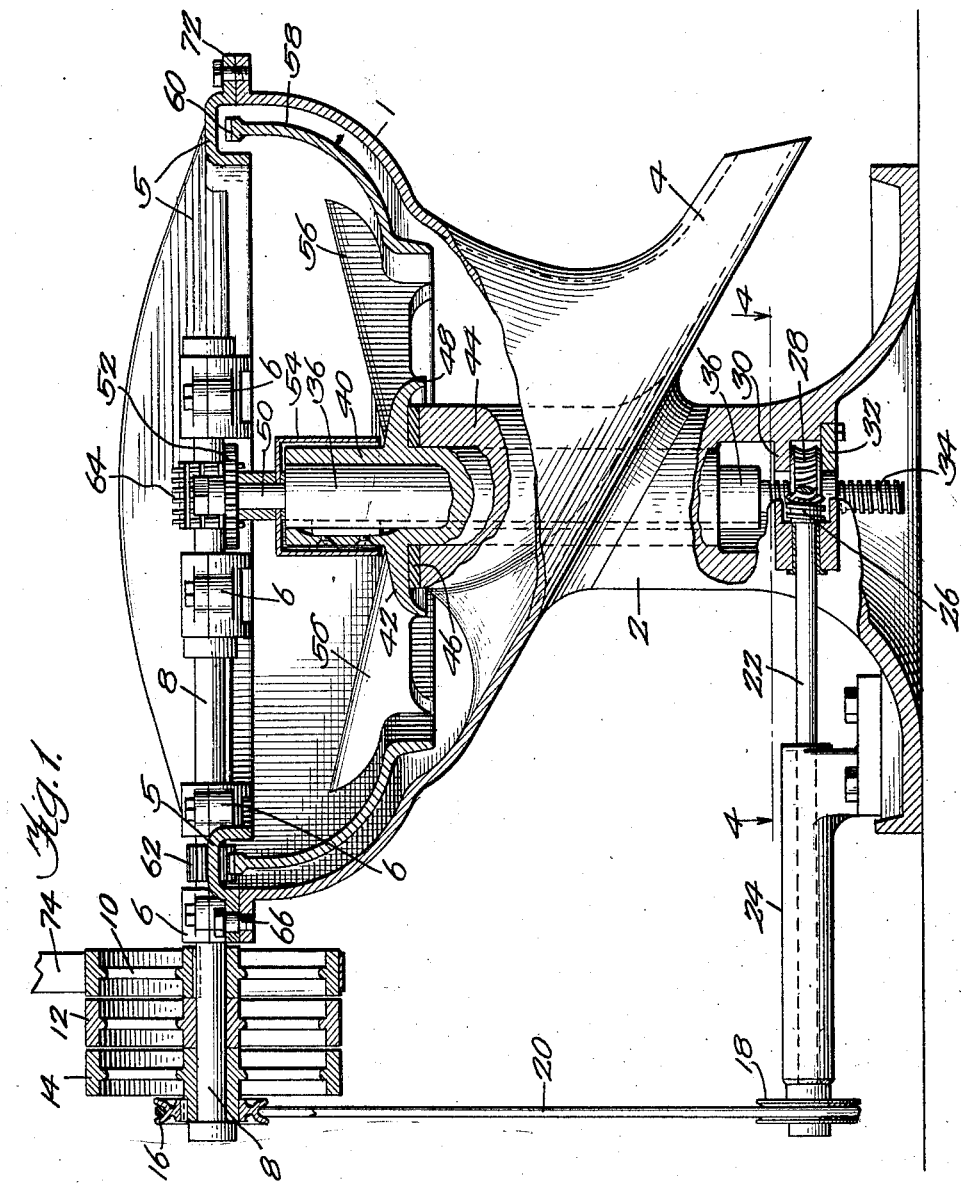

Patented June 1, 1926.

1,587,029

UNITED STATES PATENT OFFICE.

CARL G. OLSON, OF CHICAGO, ILLINOIS, ASSIGNOR TO ILLINOIS TOOL WORKS, OF CHICAGO, ILLINOIS, A CORPORATION OF ILLINOIS.

HOBBING MACHINE.

Application filed December 6, 1922. Serial No. 605,321.

My invention relates to machines used for the production of gear wheels and the like by the hobbing method, in other words, to hobbing machines, and one of the objects is to produce a machine of extreme simplicity, thereby minimizing expense and reducing backlash to a minimum. It will be understood that in the ordinary hobbing machine there are many shafts, gears and bearings, and the result is that while the individual elements may be approximately perfect in themselves, the mere number of them may produce in the aggregate a considerable percentage of error. Furthermore there are many points and surfaces where wear occurs and where lubrication must be provided for. This is in addition to the expense necessarily involved in the production of a machine having many elements. In my machine, in its developed form, it may be said that there is but a single pair of gears interposed between the hob and the work, thus reducing the gearing to a theoretical minimum. According to the design shown, the hob is secured directly to the power shaft, and a pinion, which is also fastened to the power shaft, meshes directly with the element to which the gear blank or work is fastened. Another object of the invention is to provide a machine so constructed that the shavings may be readily collected in the machine and discharged at a single point. Still another object is to provide means of adjustment in case of wear of the hob and in case gears of different diameters are to be produced.

I accomplish my objects by the mechanism illustrated in the accompanying drawings in which—

Figure 1 is a side elevation, partly in axial section, showing the complete machine.

Figure 2 is a top plan view of the machine, fragments of which are broken away for revealing the internal parts.

Figure 3 is a detail showing the driving gear for the hob spindle and work spindle.

Figure 4 is a plan section showing the chief parts of the feed mechanism.

Like numerals denote like parts throughout the several views.

In the form illustrated, there is a bowl shaped main frame 1 which is supported upon a pedestal 2 and has a spout 4 leading obliquely downward to the side for delivering the mixture of oil and cuttings produced during the operation of the machine. The main frame has a cover 5 provided with a plurality of bearings 6 in which the driving shaft 8 is journaled. Said shaft supports three pulleys 10, 12 and 14. Pulley 10 is keyed or otherwise secured to the shaft for driving it. Pulley 12 is an idler and pulley 14 is also loose upon the shaft, its function being to return the work spindle to initial position in the manner presently to be described. A sheave 16 is keyed to the hub of pulley 14 and serves to drive a sheave 18 through the medium of a belt 20. Sheave 18 is fastened to a worm shaft 22 which is journaled in a bearing 24, fastened to the base of the pedestal. A worm 26 is fastened to shaft 22 and meshes with a worm wheel 28 which is arranged horizontally between a stationary annular shoulder 30 above it and a plate 32 below it, as shown near the bottom of Figure 1. The worm wheel is internally threaded to work upon a feed screw 34, which is rigid with the work spindle 36. The annular shoulder 30 and plate 32 are spaced far enough apart to permit the worm wheel to rotate freely between them, but they prevent it from moving vertically in either direction. The construction is such that if the worm wheel is held against rotation, the rotation of the work spindle will cause the latter to rise (which produces the feed). On the other hand if the work spindle is held against rotation, the rotation of the worm wheel will cause the work spindle to descend (which returns the spindle to initial position).

The work spindle is splined to a vertically arranged sleeve 40, which has an annular shoulder 42, which supports it upon the sleeve 44. According to the present design said sleeve 44 forms a portion of the main frame and constitutes a cylindrical bearing for said shoulder. In other words, the main frame, which rests upon the pedestal, has an internal cylindrical portion 44 which forms a step bearing for the annular shoulder 42 of the sleeve 40. If desired, an anti-friction gasket 46 may be interposed between the upper end of the step bearing, and the bottom of shoulder 42. In order to shed the shavings and oil from the step bearing it is desirable to extend the annular shoulder 42 outward and downward to form a shield 48. This prevents the shavings from reaching the step bearing.

The work spindle 36 has a reduced portion 50 at its upper end to which the gear blank or work 52 is fastened. Resting upon the shoulder formed by the reduction of diameter of the work spindle is a hood 54 which keeps the shavings out of the bearings beneath.

Rigidly secured to sleeve 40, by radially arranged ribs 56 or other appropriate means is a rotatable element 58 which in the illustrated form is bowl shaped and conforms approximately to the shape of the upper portion of the main frame. The upper circular periphery of element 58 forms a support for a gear 60 which is here shown integral with it. This gear is arranged horizontally and concentrically with the work spindle and meshes with a pinion 62 rigidly fastened to the shaft 8. The parts 60 and 62 constitute practically a bevel gear and pinion but are preferably of a special type presently to be described. The drive shaft 8 is also the hob spindle, for the hob 64 is fastened to it in position to act upon the gear blank. The hob illustrated is of the right angle type, that is, the hob axis is at right angles to the work axis, altho this is merely a matter of design. The hob axis is, however, spaced from the work axis and to accommodate this spacing, the pinion 62 is arranged "off center" and the teeth of the gear 60 do not converge directly toward the center. The construction is shown in detail in Figure 1.

The cover 5 previously mentioned is angularly adjustable in a horizontal plane upon the top of the main frame. It pivots upon a shouldered stud 66, which screws into the main frame shown at the left of Figures 1 and 2. Thus it is capable of swinging horizontally thru a moderate angle, and is held in proper position by clamping bolts 68, which penetrate slots 70 formed in lugs 72 projecting from the cover as best shown in Figure 2. It will be evident that by swinging the cover about its pivot the hob may be brought nearer to or moved further from the work spindle. It will be understood that as hobs are used they require sharpening from time to time, which gradually reduces their diameter, and by taking advantage of the adjustability of the cover upon the main frame the hob may be always brought into correct position with reference to the gear blank or work. It is also possible to thus shift the cover sufficiently to produce gear wheels of slightly larger or slightly smaller diameter, although on account of the direct gearing in this machine the number of teeth in the work will remain the same for a given type of hob. In order to accommodate this shifting of the hob in a horizontal plane the teeth of the bevelled gear 60 are rounded as shown in detail in Figure 3.

In using the machine when the set-up has been completed with the gear blank and hob in place, the drive belt 74 will be shifted from the idler 12 to the fast pulley 10, which will cause the driving shaft and hob spindle 8 to rotate the hob. At the same time the pinion 62 will drive the gear 60 and thus rotate the work spindle 36, 50. The relative feed between the hob and the work or gear blank must be in a direction parallel to the axis of rotation of the work, and this is accomplished in my machine by the mechanism shown in Figure 4 and at the bottom of Figure 1. It is well understood that a worm and gear constitute a locked mechanism in the sense that while the worm is capable of driving the worm wheel, the worm wheel will be locked by the worm; hence as the worm 26 in my machine locks the worm wheel 28 against rotation the latter acts as a nut, and the rotation of the work spindle and screw 34 causes the work spindle to travel longitudinally. As the action proceeds, the gear blank rises, and as it is simultaneously rotated in contact with the rotating hob the teeth will be generated in accordance with the principles of hobbing. After the work is completed and the teeth have been cut in the gear blank, the spindle is lowered to initial position by shifting the belt 74 to the pulley 14. As this pulley is loose upon the shaft it does not impart any rotary movement to the hob but drives the sheave 16, belt 20 and sheave 18, thus causing the worm shaft 22 and worm 26 to rotate. The rotation of the worm causes a corresponding rotation of the worm wheel 28, and as the work spindle 36 and feed screw 34 are at rest the rotation of the worm wheel will cause the screw and work spindle to descend. It will be noted that the bearings are well protected from shavings falling from the work, the hood 54 excluding the shavings from the spindle bearings and the shield 42 excluding them from the bearing of the sleeve 44. The shavings, as they fall, will be gathered into the spout 4, from which they will issue into a waiting receptacle, after which the oil may be drained off and used again.

It will be noted that in my machine the hob spindle is rigidly secured to pinion 62 which meshes directly with the bevel gear 60, which, in turn, is rigidly connected to the work spindle; hence the only possible backlash is confined to a single point, that is, where the pinion and gear mesh with each other. This is in contrast to the more or less complex gear trains present in most hobbing machines. There is in my machine also a corresponding simplification in the other parts of the machine, for it will be observed that the driving shaft and hob spindle are one and the same element, and the pulleys are directly fastened to it as well as the hob.

The number of bearings is correspondingly reduced and the result is that the sources of inaccuracy are reduced to a minimum. It will be understood that in a hobbing machine the hob and the gear blank must both be accurately timed and that such timing is interfered with not only in the case of worn gears but also in the case of worn shafts and bearings. With these parts reduced in number and simplified in construction, as in my machine, the mechanism will remain in first-class order for a long period of time and hence may be relied upon to continue to produce accurate work.

Having thus described my invention, what I claim as new and desire to secure by Letters Patent is:—

1. In a hobbing machine, a hob spindle and a work spindle geared together by a single pair of intermeshing gears, the work spindle and its gear being always rotatable in unison but relatively shiftable axially to permit axial feeding of the work spindle, and means for feeding the work spindle axially, the hob spindle being axially fixed to thereby cause the hob to rotate in place.

2. In a hobbing machine, a hob spindle and a work spindle, two gears meshing directly with each other, said spindles being directly connected to the gears so as to rotate in unison with them, respectively, the work spindle being splined to its gear for permitting the work spindle to be fed axially, means for feeding the work spindle axially, and means for applying power to one of said gears, the hob spindle being laterally fixed for rotating the hob in place.

3. In a hobbing machine, a hob spindle, a work spindle, two gear wheels directly connected to said spindles respectively, said gear wheels meshing directly with each other, means for driving one of said gear wheels, one of the spindles being splined to its gear wheel whereby it may move longitudinally for feeding purposes, and a feed nut adapted to be held stationary, said last named spindle having a feed screw fastened to it and working in said nut whereby as the spindle rotates it will feed longitudinally.

4. In a hobbing machine, a hob spindle, a work spindle, two gear wheels directly connected to said spindles respectively, said gear wheels meshing directly with each other, means for driving one of said gear wheels, one of the spindles being splined to its gear wheel whereby it may move longitudinally for feeding purposes, a feed nut adapted to be held stationary, said last named spindle having a feed screw fastened to it and working in said nut whereby as the spindle rotates it will feed longitudinally, said feed nut being rotatable and having means for rotating it whereby when the nut is rotated and the spindle is still, the spindle will be returned to initial position.

5. In a hobbing machine, a shaft having a tight and two loose pulleys mounted on it, said shaft being adapted to have the hob fastened to it and having a pinion also secured to it, a bevel gear meshing directly with said pinion, a work spindle splined to the bevel gear, and feed mechanism for causing relative motion between the shaft and the work spindle in the direction of the axis of the work spindle, said feed mechanism being connected to and actuated by one of said loose pulleys.

6. A hobbing machine having a bowl shaped main frame with a shaft mounted horizontally in it, said shaft being provided with driving mechanism and being adapted to support the hob, a bevel gear meshing with said pinion, said bevel gear being approximately bowl shaped, and located within the main frame, a work spindle arranged vertically and splined to the bowl shaped bevel gear whereby the work spindle will be rotated by it, but will be free to move axially with respect to it, and feed mechanism actuated by said spindle when the latter is rotating for moving said work spindle in an axial direction.

7. A hobbing machine having a bowl shaped main frame, a shaft journaled horizontally in said frame, said shaft being adapted to support the hob, power mechanism mounted directly on the shaft, a pinion secured to said shaft, a bowl shaped bevel gear meshing directly with said pinion, said bevel gear being co-axial with the main frame and located within it, a work spindle arranged co-axial with said bevel gear and splined relatively to it, means for feeding the work spindle axially, and a spout formed at the bottom of the main frame for collecting and discharging the shavings and oil.

8. In a hobbing machine, a work spindle, a hob spindle, means for rotating them in timed relation, a feed screw connected to said work spindle for producing relative feeding movement between the two spindles, a nut on said feed screw, said nut being in the form of a worm wheel, means for preventing axial movement of said worm wheel, a worm for rotating said worm wheel at times and holding it locked against rotation at other times whereby when the worm wheel is held locked and the feed screw rotates there will be a feeding movement of the work spindle, and when the feed screw is still and the worm wheel rotates there will be an axial movement of the work spindle in the opposite direction.

9. In a hobbing machine, a main frame having a step bearing, a sleeve journaled in the main frame and having an annular flange seating upon said step bearing, a work spindle splined to said sleeve, means for feeding the work spindle longitudinally in the sleeve, a bevel gear for rotating the sleeve, a pinion for rotating the bevel gear, and a power shaft whereon the pinion is mounted, said shaft being also adapted to support the hob.

10. In a hobbing machine, a bowl shaped main frame, a partial cover pivoted to said main frame and angularly adjustable thereon in a horizontal plane, a hob spindle journaled in said cover, a work spindle journaled in the main frame at right angles to the hob spindle, gears for causing the spindles to rotate in timed relation, and means for securing the cover in various angular positions upon the main frame for controlling the distance of the hob axis from the work axis.

11. In a hobbing machine, a main frame, a work spindle journaled therein, an annular gear wheel concentric with the work spindle and rotating in unison therewith, a pinion meshing with the annular gear for driving it, a shaft for rotating the pinion, said shaft being also adapted to support the hob, and means for supporting the shaft in a plane at right angles to the axis of the work spindle, but off center, the teeth of the annular gear being non-radial for accommodating the off-center arrangement of the shaft and pinion.

12. In a hobbing machine, a main frame, a work spindle journaled therein, an annular gear wheel concentric with the work spindle and rotating in unison therewith, a pinion meshing with the annular gear for driving it, a shaft for rotating the pinion, said shaft being also adapted to support the hob, and supporting means for supporting the shaft in a plane at right angles to the axis of the work spindle but off-center, the teeth of the angular gear being non-radial for accommodating the off-center arrangement of the shaft and pinion, said supporting means being angularly adjustable upon the main frame for bringing the hob toward and from the work, the teeth of the angular gear being slightly rounded for permitting such angular adjustment.

In witness whereof, I have hereunto subscribed my name.

CARL G. OLSON.